(12) United States Patent
Teimel et al.

(10) Patent No.: US 9,570,963 B2
(45) Date of Patent: Feb. 14, 2017

(54) BRUSH COVER FOR A BRUSH-COMMUTATED ELECTRIC MOTOR AND ELECTRIC MOTOR

(71) Applicant: Maxon Motor AG, Sachseln (CH)

(72) Inventors: Arnold Teimel, Giswil (CH); Reto Walker, Kriens (CH); Dirk Uhlich, Kern (CH)

(73) Assignee: MAXON MOTOR AG, Sachseln (CH)

( * ) Notice: Subject to any disclaimer, the term of this patent is extended or adjusted under 35 U.S.C. 154(b) by 0 days.

(21) Appl. No.: 13/692,616

(22) Filed: Dec. 3, 2012

(65) Prior Publication Data

US 2013/0140941 A1    Jun. 6, 2013

(30) Foreign Application Priority Data

Dec. 2, 2011   (EP) ..................... 11009558

(51) Int. Cl.
*H02K 13/00* (2006.01)
*H02K 13/10* (2006.01)
*H02K 5/14* (2006.01)

(52) U.S. Cl.
CPC .............. *H02K 13/10* (2013.01); *H02K 5/146* (2013.01)

(58) Field of Classification Search
CPC ........... H02K 5/14; H02K 13/00; H02K 13/16
USPC .......... 310/239, 240, 242, 244, 40 MM, 251
See application file for complete search history.

(56) References Cited

U.S. PATENT DOCUMENTS

| | | | | |
|---|---|---|---|---|
| 895,878 | A * | 8/1908 | Mitchell | 310/244 |
| 1,270,957 | A * | 7/1918 | Kolff | H01R 39/39 |
| | | | | 310/244 |
| 2,026,644 | A * | 1/1936 | Monteith | H02K 5/146 |
| | | | | 310/244 |
| 3,654,504 | A * | 4/1972 | Susdorf et al. | 310/239 |
| 3,851,197 | A * | 11/1974 | Watanabe | A61C 1/06 |
| | | | | 310/244 |
| 4,752,208 | A * | 6/1988 | Iwata et al. | 425/577 |
| 6,329,735 | B1 * | 12/2001 | Tanaka et al. | 310/239 |
| 6,491,487 | B1 | 12/2002 | Wojciechowski | |
| 2005/0264127 | A1 | 12/2005 | Benkert et al. | |
| 2007/0001537 | A1 | 1/2007 | Okamoto | |
| 2011/0028642 | A1 * | 2/2011 | Xie et al. | 524/590 |

FOREIGN PATENT DOCUMENTS

| | | |
|---|---|---|
| CN | 1524164 A | 8/2004 |
| CN | 1752476 A | 3/2006 |
| DE | 33 11 271 A1 | 10/1984 |
| DE | 296 05 114 U1 | 7/1996 |
| EP | 1 528 656 A1 | 5/2005 |

(Continued)

OTHER PUBLICATIONS

Machine Translation FR1248501 (1960).*

(Continued)

*Primary Examiner* — Jose Gonzalez Quinones
(74) *Attorney, Agent, or Firm* — Buchanan Ingersoll & Rooney PC

(57) ABSTRACT

The present invention relates to a brush cover for a brush-commutated electric motor. The brush cover comprises at least one lever brush which is mounted rotatably about an axis at the brush cover by means of a bolt. According to the invention, the bolt is surrounded, at least in sections, by at least one damping sleeve of an elastomer.

19 Claims, 2 Drawing Sheets

(56) References Cited

FOREIGN PATENT DOCUMENTS

Figure 1:
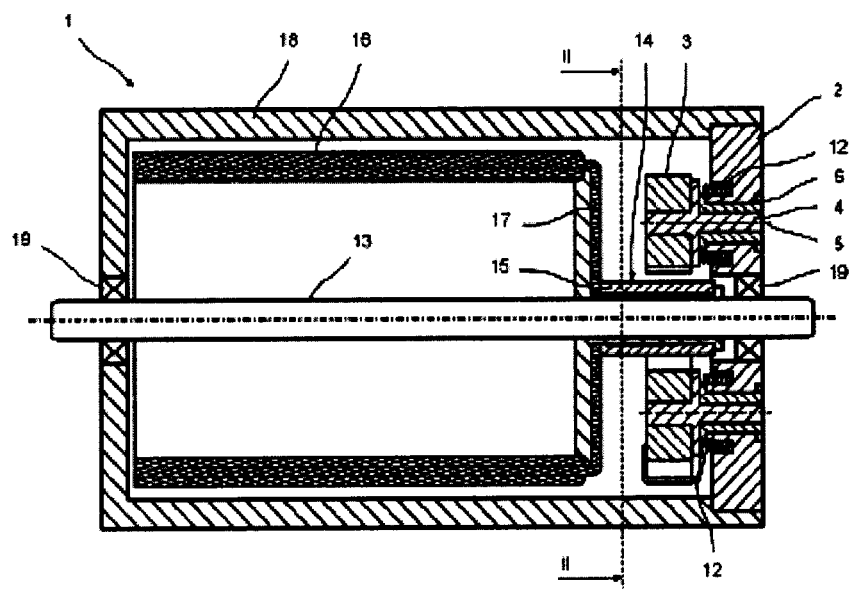

| EP | 1 598 922 A1 | | 11/2005 |
|---|---|---|---|
| EP | 1 808 942 A2 | | 7/2007 |
| FR | 1 248 501 A | | 11/1960 |
| FR | 1248501 A1 | * | 11/1960 |
| JP | 2003-189553 A | | 7/2003 |
| JP | 2006090409 A | * | 4/2006 |

OTHER PUBLICATIONS

European Search Report for EP 11009558.5 dated Mar. 9, 2012.
Office Action issued on Sep. 4, 2014, by the Chinese Patent Office in corresponding Chinese Patent Application No. 201210511119.6, and an English Translation of the Office Action. (17 pages).

* cited by examiner

BRUSH COVER FOR A BRUSH-COMMUTATED ELECTRIC MOTOR AND ELECTRIC MOTOR

The invention relates to a brush cover for a brush-commutated electric motor according to the preamble of independent claim 1. Such a generic brush cover comprises at least one lever brush which is mounted at the brush cover rotatably about an axis. A bolt is provided for the rotatable mounting.

A brush cover of the type mentioned in the beginning is known from DE 29605114 U1.

In electric motors which are operated with direct current, a commutator is provided on the shaft of the rotor if the rotor of the electric motor is not a permanent-magnet rotor, the commutator taking care that current is alternately applied to the different rotor windings at the right time. The collector of the commutator is equipped with a plurality of segments at its surface area which are distributed across the circumference of the collector and are normally in sliding contact alternately with two carbon or graphite brushes, or steel brushes. The provided voltage is applied to the brushes. The rotor coils are each electrically connected to a pair of segments of the collector. By the rotation of the rotor, different pairs of segments each of the collector come into contact with the two brushes, so that it is always a different rotor coil to which current is applied.

To ensure good contact between the brushes and the segments of the collector, the brushes in the electric motor are mounted to be pretensioned against the segments of the collector. Since carbon or graphite brushes are subject to wear over time, they must be constantly replaced. Therefore, the brushes must be specially supported in the electric motor. From prior art, two different types of brush covers for brush-commutated electric motors are known. A well-known design is referred to as so-called cartridge-type brush cover. Cartridge-type brushes are graphite rods which are guided in wells, so-called cartridges, and are pretensioned towards the surface area of the collector by means of a pressure spring. The shafts or cartridges in which the cartridge-type brushes are guided extend radially from the outside towards the surface area of the collector. They are part of the brush cover which is in most cases provided as separate component of the electric motor. However, it can also be integrally formed with the housing of the electric motor.

Instead of the well-known cartridge-type brushes, the brush cover can also be equipped with a second known type of brushes, which are so-called lever brushes. Lever brushes are, similar to some pick-up arms of record players, designed like a hook and rotatably articulated at the brush cover. Due to their hook-like shape, lever brushes are also referred to as worm brushes. The free end of the hook-like lever brush rests against the outer periphery of the collector and is pretensioned against it. For this, a corresponding spring is provided which can have various designs. The rotatable mounting at the brush cover is normally realized by means of a bolt, that means by means of a short shaft section. The bolt can be injected to the brush cover or else be pressed into a corresponding bore of the brush cover. A rotatable mounting of the bolt in the brush cover is also possible. Due to their shape, lever or worm brushes permit a longer wear length than cartridge-type brushes with the same motor size, and they therefore offer clear advantages in view of service life in motors of small diameters.

The collector of an electric motor is normally fabricated very precisely, observing very small diameter and concentricity tolerances. Nevertheless, slight eccentricities of the collector and the smallest steps at the transitions between the collector segments lead to a periodic deflection of the brushes against spring force. This causes vibrations which are transmitted from the brushes over the brush cover to further parts of the motor and are emitted from these motor parts as sound. The resulting noise generation is undesired in many applications. One possibility of reducing noise generation is to design the transmitting parts as rigidly and as massively as possible. This mainly relates to the brush cover on which the brushes are supported. A disadvantage of this measure is the additionally required installation space and its high weight and increased costs in the fabrication of the electric motor.

From DE 3311271 A1, a brush cover with cartridge-type brushes is known where the undesired noise generation is to be prevented by employing rubbery elastic insets. The brushes are guided in hollow-walled cartridges which in turn are held in a well of the brush cover. The rubbery elastic inset is located between the well and the hollow-walled cartridge disposed therein. A possible solution for preventing the undesired noise generation in brush covers with lever brushes is not indicated in DE 3311271 A1.

A further brush cover which is also designed for mounting cartridge-type brushes is known from EP 1528656 A1. To prevent the transmission of vibrations, the brush cover is designed in two parts, wherein several damping elements are provided between the part of the brush cover where the cartridge-type brushes are supported and the part of the brush cover which is connected with the housing of the electric motor. The vibration-isolated, two-part design of the brush cover can be theoretically also transferred to brush covers with lever or worm brushes. However, this construction requires a relatively large structural volume. Moreover, fabrication and assembly are expensive and time-consuming.

It is therefore the object of the present invention to improve the brush cover of the type mentioned in the beginning to the effect that a minimum amount of vibrations and noise are generated in the electric motor, wherein the brush cover should be simple as to its construction and inexpensive to manufacture.

The object is achieved by the features of independent claim 1. Accordingly, a solution according to the invention is present if the bolt is surrounded at least in sections by at least one damping sleeve of an elastomer. This extremely effectively prevents the transmission of vibrations in a simple manner. The sleeve is preferably hollow cylindrical. However, the term sleeve should not necessarily be understood as a cylindrical component in this disclosure. Other designs, in particular of the outer periphery of the sleeve, are also conceivable. Preferably, the sleeve rests with a form-fit against the bolt over a certain length and against an external component, for example the brush cover.

Other advantageous embodiments are the subject matter of the subclaims.

In one preferred embodiment of the present invention, the bolt is received in a recess, preferably a bore, of the brush cover, the damping sleeve being disposed between the wall of the recess of the brush cover and the bolt. This design can be particularly easily manufactured and offers a precise mounting of the bolt in the brush cover or in the damping sleeve, respectively, which is disposed between the recess of the brush cover and the bolt. This embodiment also offers the advantage that existing spare brushes can be still used. At its other end projecting from the brush cover, the bolt can be designed either in one piece with the lever brush, or it can be pressed into a bore of the lever brush. The bolt can also be rotatably mounted in a bore of the lever brush, so that a double rotatable mounting of the lever brush results, namely between the bolt and the brush cover and between the bolt and the lever brush.

In another embodiment of the present invention, the bolt is received in a bore of the lever brush, the damping sleeve being disposed between the wall of the bore and the bolt. This permits to retrofit existing electric motors with a vibration damping. This embodiment is accordingly also suited if the bolt is integrally formed with the brush cover, namely for example injected to it. This embodiment is of course also suited if the bolt is pressed into a bore of the brush cover or rotatably mounted in this bore.

Moreover, one inventive damping sleeve of elastomer each can be arranged both between a bore of the brush and the bolt and between a bore of the brush cover and the bolt. By a simple measure, a very high damping of the brush vibrations can be thus achieved. In this embodiment, it is also conceivable that one single damping sleeve extends over the complete length of the bolt and the bolt is inserted, together with the damping sleeve, both in a bore of the lever brush and in a bore of the brush cover. This can reduce the number of required components.

In one embodiment of the present invention, the damping sleeve is provided as separately manufactured component.

In another preferred embodiment of the present invention, the damping sleeve comprises axial positive locking elements which are engaged with corresponding axial positive locking elements of the bolt and/or housing cover, or the bolt and/or lever brush. By this, the components can be secured against each other against shifting in the axial direction. As positive locking elements, preferably surrounding radial springs and grooves are suited which, in the mounted state, engage each other. Thus, the damping sleeve can preferably comprise one or several surrounding ribs or springs which engage corresponding surrounding grooves in the bore of the housing cover or the lever brush. The surrounding springs can be designed such that they can be compressed due to the elasticity of the sleeve, so that the parts for assembling the brush cover can be inserted into each other. For example, the damping sleeve can be inserted into a bore of the brush cover, wherein the ribs or springs, respectively, formed at the outer periphery of the damping sleeve lock into place in corresponding grooves of the brush cover bore as soon as the damping sleeve is completely inserted. The surrounding, radially projecting ribs of the damping sleeve can also be formed at the two front faces of the damping sleeve so that they form externally projecting flanges which rest against the front and rear sides of the brush cover. For axially securing the bolt, the latter is preferably somewhat wider at one point. In this manner, the bolt can also comprise, for example, a surrounding rib or spring projecting to the outside.

The damping sleeve provided as separate component can also be glued into the recess of the brush cover or into the bore of the lever brush, or it can be glued onto the bolt.

In a further particularly preferred embodiment of the present invention, the bolt comprises a first section and a second section, the first section being mounted in the recess of the brush cover, and the second section being mounted in the bore of the lever brush, and the bolt comprising, between the first and the second sections, a radially projecting, flange-like disk. This disk assumes a double function. On the one hand, it forms a washer between the lever brush and the brush cover or the edge of the damping sleeve inserted in the brush cover. On the other hand, the bolt is secured against axial shifting by the projecting, flange-like disk.

It showed to be particularly advantageous for the hardness of the elastomer from which the damping sleeve is made to be between 70 and 85 Shore A. With this material quality, vibrations can be very well dampened, where simultaneously a secure mounting of the bolt remains ensured.

In another preferred embodiment of the present invention, the elastomer is a thermoplastic. By this, the damping sleeve provided according to the invention can be easily manufactured, for example by injection molding. As an alternative, polyurethane, silicone rubber or a vulcanized elastomer are suited as materials for the damping sleeve.

A particularly simple and inexpensive manufacture is permitted by injecting the damping sleeve into the recess of the brush cover or into the bore of the lever brush by two-component injection molding. In this way, the above mentioned flange provided on both sides for axially securing the damping sleeve can also be easily and inexpensively added by injection molding. Moreover, the damping sleeve provided according to the invention is then firmly connected to the brush cover or the lever brush, so that no additional components must be provided for the assembly of the brush cover, resulting in an easy and quick assembly.

In another preferred embodiment of the present invention, the damping sleeve can also be firmly attached to the bolt. Here, the same advantages result for the assembly. For example, the damping sleeve can be vulcanized or injected onto the bolt, or else it can be glued onto it.

In a further particularly preferred embodiment of the present invention, the damping sleeve has a wall thickness between 0.3 and 0.7 mm. It showed that with these wall thicknesses, an optimal vibration dampening can be achieved with relatively little material.

The invention furthermore provides an electric motor with a brush cover according to the invention. The electric motor can be a d. c. motor excited by a permanent magnet or an electrically excited d. c. motor.

Figure 2:
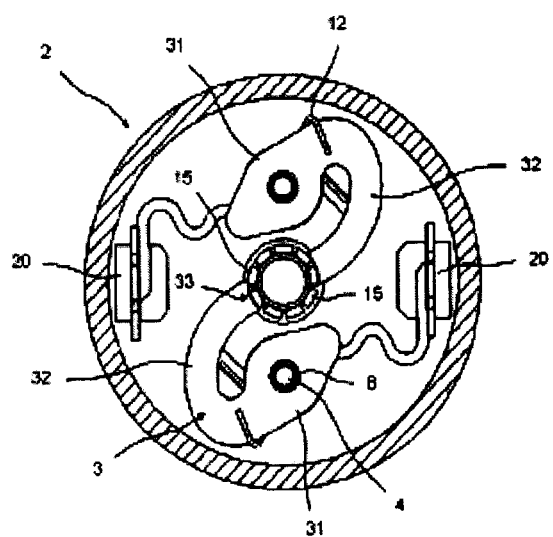
Figure 3:
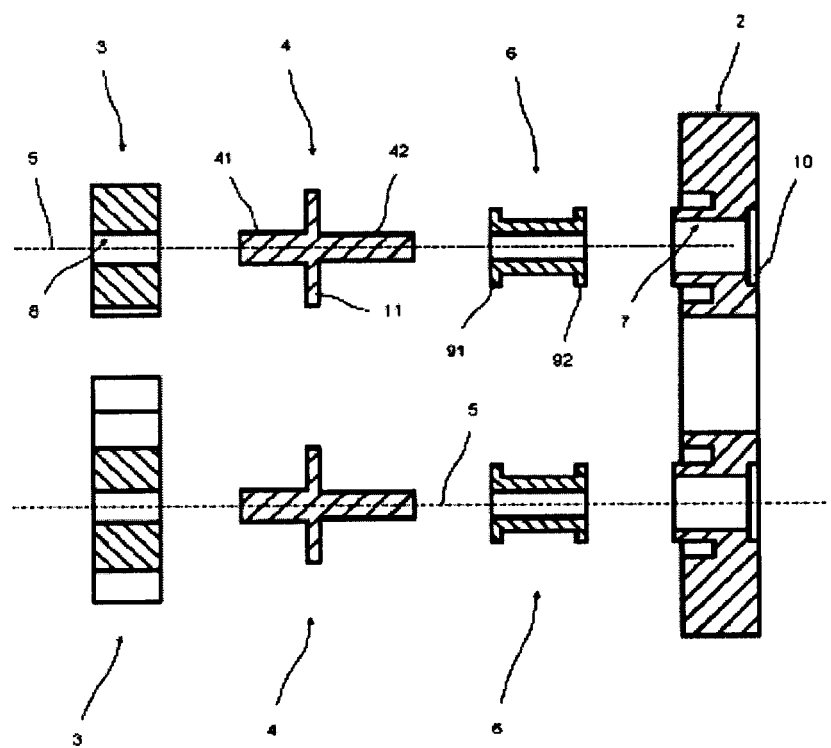

One embodiment of the present invention will be illustrated more in detail below with reference to drawings. In the drawings:

FIG. 1 shows a longitudinal section through an electric motor with a brush cover according to the invention, FIG. 2 shows a cross-sectional representation perpendicular to the axis of the electric motor along the section lines II in FIG. 1, and FIG. 3 shows an exploded view of the brush cover of FIG. 1.

In the following illustrations, equal parts are designated by equal reference numerals. If a drawing contains reference numerals which are not explicitly discussed in the pertaining description of the figures, reference is made to previous descriptions of the figures.

FIG. 1 shows a longitudinal section through an electric motor 1 with a brush cover 2 according to the invention. The electric motor 1 comprises a housing 18 which is closed by the brush cover 2 on the right side. The electric motor 1 furthermore comprises a rotor assembly and a stator which is not shown in the representation. The rotor assembly consists of the rotor shaft 13, the hollow-cylindrical rotor winding 16 arranged coaxially to the rotor shaft 13, and the collector 14 located on the rotor shaft 13. The rotor shaft 13 is rotatably mounted in the housing 18 or in the brush cover 2, respectively, via corresponding ball bearings 19. The winding 16 of the rotor assembly comprises several coils whose connections 17 are each electrically connected with segments 15 of the collector 14.

As can be taken from the cross-sectional view of FIG. 2, the brush cover 2 comprises two lever brushes 3 which are rotatably mounted at the brush cover 2 about an axis 5 shown in FIG. 1 which extends in parallel to the rotor shaft 13. The two lever brushes each comprise a head region 31 and an adjacent curved hook 32. The curved hook 32 extends in a constant radius to the axis 5 about which the lever brush 3 is rotatably mounted at the brush cover. As can be in particular taken from FIG. 1, the head region 31 of the lever brush comprises a bore 8 in which a bearing bolt 4 is received whose axis corresponds to the axis of revolution 5. The lever brushes 3 are pretensioned by means of a spring 12, so that the free ends 33 of the curved hooks 32 are continuously pressed against the segments 15 of the collector 14. At the head region 31, the two lever brushes are electrically connected with the two electric connections 20 of the electric motor 1. The two lever brushes are graphite brushes.

The exact type of mounting of the lever brushes 3 at the brush cover 2 can be taken from FIGS. 1 and 3. The bolt 4 which serves to rotatably mount the lever brushes comprises a first section 41 and a second section 42. Between the first section 41 and the second section 42, a disk 11 embodied like a flange radially projects from the bolt 4. While the first section 41 of the bolt 4 is seated in the bore 8 of the head region 31 of the lever brush 3, the second section 42 of the bolt 4 is received in a bore 7 of the brush cover 2, wherein between the wall of the bore 7 and the cylindrical second section 42 of the bolt 4, a damping sleeve of an elastomer is arranged. The damping sleeve is designated with reference numeral 6 in FIG. 1. As is in particular shown in FIG. 3, the damping sleeve 6 has a hollow-cylindrical design and is therefore lying with a form-fit against the wall of the bore 7 of the brush cover 2 and against the outer periphery of the second section 42 of the bolt 4. Flange-like ribs 91 and 92 radially projecting to the outside are formed at both ends of the damping sleeve 6 and prevent the damping sleeve 6 from shifting in the direction of the longitudinal axis 5. The left flange 91 of the damping sleeve 6 is lying with a form-fit against the side of the brush cover 2 facing inwards. The flange 92 shown in the right in the representation in FIG. 3 is received in a stepped groove 10 on the opposite side of the brush cover. The damping sleeve 6 takes care that vibrations, which are transmitted from the rotating collector 14 to the lever brushes 3 and thus to the bearing bolts 4 connected to the lever brushes, are nearly absorbed, so that they are hardly further transmitted to the brush cover and to the housing 18 of the electric motor.

The damping sleeve 6 preferably consists of a thermoplastic elastomer and is, in the fabrication of the brush cover 2, injected into the corresponding bore 7 of the brush cover in a two-component injection molding process. The brush cover 2 preferably consists of a thermoplastic, so that a good coherence between the damping sleeve 6 and the brush cover 2 is ensured.

As was already mentioned above, it is pointed out that the damping sleeve can also be manufactured as a separate component. The damping sleeve can also be glued to the brush cover. It is also possible to firmly connect the damping sleeve with the bearing bolt 4.

As is shown in FIG. 1, the disk 11 of the bearing bolt 4 radially projecting to the outside serves as washer between the lever brush and the brush cover or the damping sleeve 6, respectively. The left flange 91 of the damping sleeve 6 is lying flatly against the disk 11 of the bearing bolt 4. Thus, the disk 11 also serves to secure the bearing bolt 4 against shifting in the axial direction.

The invention claimed is:

1. A brush-commutated electric motor, comprising:
   a housing;
   a brush cover, wherein the housing has an opening closed by the brush cover;
   at least one lever brush mounted rotatably about an axis in the brush cover by a bolt to be freely rotatable over 360°; and
   at least one elastomer damping sleeve, wherein the hardness of the elastomer is between 70 and 85 Shore A, the bolt being surrounded, at least in sections, by the at least one damping sleeve, wherein the bolt and the at least one damping sleeve are received in a recess of the brush cover, the damping sleeve being disposed between a wall of the recess of the brush cover and the bolt.

2. The electric motor according to claim 1, wherein the bolt is received in a bore of the lever brush, the damping sleeve being disposed between the wall of the bore and the bolt.

3. The electric motor according to claim 1, wherein the damping sleeve comprises axial positive locking elements which are engaged with corresponding axial positive locking elements of the bolt and/or housing cover or the bolt and/or lever brush.

4. The electric motor according to claim 3, wherein the axial positive locking elements include flange-like ribs projecting radially outward arranged at first and second ends of the damping sleeve.

5. The electric motor according to claim 1, wherein the bolt comprises a first section and a second section, the first section being mounted in the recess of the brush cover and the second section being mounted in the bore of the lever brush, and the bolt comprising, between the first and the second sections, a radially projecting flange-like disk.

6. The electric motor according to claim 1, wherein the elastomer is a thermoplastic.

7. The electric motor according to claim 1, wherein the damping sleeve is injected into the recess of the brush cover or into the bore of the lever brush by a two-component injection molding process.

8. The electric motor according to claim 1, wherein the damping sleeve is firmly attached to the bolt.

9. The electric motor according to claim 1, wherein the damping sleeve has a wall thickness between 0.3 and 0.7 mm.

10. A brush-commutated electric motor, comprising:
    a housing;
    a brush cover, wherein the housing has an opening closed by the brush cover;
    at least one lever brush mounted rotatably about an axis in the brush cover by a bolt, the bolt being surrounded, at least in sections, by at least one damping sleeve of an elastomer, wherein the hardness of the elastomer is between 70 and 85 Shore A, wherein the bolt is received in a recess of the brush cover, the damping sleeve being disposed between a wall of the recess of the brush cover and the bolt; and
    wherein the damping sleeve is firmly attached to the bolt by vulcanizing, injecting or gluing the damping sleeve onto the bolt.

11. The electric motor according to claim 10, wherein the bolt is received in a bore of the lever brush, the damping sleeve being disposed between the wall of the bore and the bolt.

12. The electric motor according to claim 10, wherein the damping sleeve comprises axial positive locking elements which are engaged with corresponding axial positive locking elements of the bolt and/or housing cover or the bolt and/or lever brush.

13. The electric motor according to claim 10, wherein the bolt comprises a first section and a second section, the first section being mounted in the recess of the brush cover and the second section being mounted in the bore of the lever brush, and the bolt comprising, between the first and the second sections, a radially projecting flange-like disk.

14. The electric motor according to claim 10, wherein the axial positive locking elements include flange-like ribs projecting radially outward arranged at first and second ends of the damping sleeve.

15. A brush-commutated electric motor, comprising:
a housing;
a brush cover, wherein the housing has an opening closed by the brush cover;
at least one lever brush mounted rotatably about a first axis in the brush cover by a bolt;
at least one elastomer damping sleeve, wherein the hardness of the elastomer is between 70 and 85 Shore A, the bolt being surrounded, at least in sections, by the at least one damping sleeve, wherein the at least one damping sleeve is received in a recess of the brush cover, and the bolt is mounted rotatably about a second axis in the damping sleeve.

16. The electric motor according to claim 15, wherein the bolt is received in a bore of the lever brush, the damping sleeve being disposed between the wall of the bore and the bolt.

17. The electric motor according to claim 15, wherein the damping sleeve comprises axial positive locking elements which are engaged with corresponding axial positive locking elements of the bolt and/or housing cover or the bolt and/or lever brush.

18. The electric motor according to claim 15, wherein the bolt comprises a first section and a second section, the first section being mounted in the recess of the brush cover and the second section being mounted in the bore of the lever brush, and the bolt comprising, between the first and the second sections, a radially projecting flange-like disk.

19. The electric motor according to claim 15, wherein the axial positive locking elements include flange-like ribs projecting radially outward arranged at first and second ends of the damping sleeve.

* * * * *